United States Patent [19]

Fawks, Jr.

[11] Patent Number: 5,790,618
[45] Date of Patent: Aug. 4, 1998

[54] METHOD AND SYSTEM FOR DETERMINING THE IMPACT OF A MISLOCATED NUCLEAR FUEL BUNDLE LOADING

[75] Inventor: James E. Fawks, Jr., Wilmington, N.C.

[73] Assignee: General Electric Company, Schenectady, N.Y.

[21] Appl. No.: 897,630

[22] Filed: Jul. 21, 1997

[51] Int. Cl.⁶ ............................................. G21C 17/00
[52] U.S. Cl. ........................................ 376/259; 376/267
[58] Field of Search .............................. 376/215, 216, 376/217, 245, 259, 267, 463

[56] References Cited

U.S. PATENT DOCUMENTS 5,272,736  12/1993  Wolters, Jr. et al. ............ 376/267
5,631,939   5/1997  Haraguchi et al. .............. 376/267

*Primary Examiner*—Daniel D. Wasil
*Attorney, Agent, or Firm*—Nixon & Vanderhye PC

[57] ABSTRACT

A method and system for identifying the maximum adverse impact of a mislocated nuclear fuel bundle placement in an nuclear core loading arrangement is presented. The method generally has an initialization phase and a "swap" case evaluation, or "search," phase. In the initialization phase, base conditions for a selected core loading arrangement are determined and parameters for exploring the mislocated fuel bundle loading error problem are set up. In the search phase, the core loading arrangement design space is explored for many combinations of mislocated fuel bundle pairs in order to find a mislocated fuel bundle pair that yields the most limiting core state. A computer system is used to execute specific program routines that simulate the operating conditions of a reactor having mislocation errors involving fuel bundle pairs in a core loading arrangement. The routines also analyze the resultant changes in operating conditions for each simulation with respect to a desired loading arrangement and/or preselected limits on design constraints to determine the impact of the mislocation error. A "search" for the mislocation error that produces the greatest impact is conducted by simulating a large number of possible mislocation errors which could occur within the particular design space for the core and comparing the relative impact of each case. Two search variables representing mislocated fuel bundles are used to test localized combinations of mislocated fuel bundles within the design space. The search variables are initialized to values corresponding to an arbitrary pair of bundles and search parameters are set up to implement a particular search strategy.

10 Claims, 2 Drawing Sheets

METHOD AND SYSTEM FOR DETERMINING THE IMPACT OF A MISLOCATED NUCLEAR FUEL BUNDLE LOADING

TECHNICAL FIELD

The present invention relates generally to nuclear reactors and more particularly to a method for determining the impact of a mislocated nuclear fuel bundle in a reactor core.

BACKGROUND

A nuclear reactor core has many, e.g., several hundred, individual fuel bundles that have different characteristics. Such bundles preferably are arranged within the reactor core so that the interaction between the fuel bundles satisfies all regulatory and commercial reactor design constraints, including governmental and customer specified constraints. In addition to satisfying the design constraints, since the core loading arrangement determines the cycle energy, i.e., the amount of energy that the reactor core generates before the core needs to be refreshed with new fuel elements, the core loading arrangement selected is one that preferably optimizes the core cycle energy.

To optimize core cycle energy, higher reactivity bundles generally are positioned at an inner core location. To satisfy certain design constraints, however, higher reactivity bundles must sometimes be positioned at an outer core location. Identifying a preferred core loading arrangement therefore presents an optimization within constraints challenge.

The number of bundle arrangements, or configurations, possible in the reactor core can be in excess of 100 factorial. Of these many different possible configurations, only a small percentage of such configurations satisfy all applicable design constraints. In addition, only a small percentage of the configurations that satisfy all applicable design constraints are economical.

Traditionally, core loading arrangement determinations are made on a trial and error basis. Specifically, and based on past experience of the engineers, a core loading arrangement is identified. The identified core loading arrangement is then simulated in a computer. If a particular design constraint is not satisfied by the identified arrangement, then the arrangement is modified and another computer simulation is run. Man-weeks of resources typically are required before an appropriate core loading arrangement is identified using the above-described procedure.

In addition, once a core loading arrangement that satisfies all design constraints has been identified using the trial and error approach, such identified core arrangement may not provide the actual maximum cycle energy. Therefore, the trial and error process continues until the engineers believe that the optimum core arrangement has been identified. In practice, however, it is possible that a particular core arrangement that is not necessarily consistent with the engineers' past experience may be the actual optimum core arrangement. Such an actual optimum core arrangement, however, may not necessarily be identified through the trial and error process.

Since the core arrangement problem generally is considered unique for each reactor and bundle characteristics, no known algorithm provides a viable solution for identifying optimum reactor core arrangements. In addition, expert systems have not been used on a broad basis since a standard set of rules typically are not applicable over a wide range of situations to the many unique and complex core loading arrangements which differ in all reactors.

It is desirable, of course, to reduce the time required to identify a core loading arrangement which optimizes cycle energy and satisfies all design constraints. Fortunately, a methodology applicable to a wide range of reactors for consistently and reliably identifying optimum core loading arrangements was developed and is the subject of commonly owned co-pending U.S. patent application (GE Docket No. 24-NT-05698) Ser. No. 08/592,887 filed Jan. 29, 1996, which is incorporated by reference herein. Basically, this methodology employs a computer system to execute specific program routines that simulate an initial core loading arrangement and then optimizes the arrangement by analyzing each fuel bundle location (e.g., to determine whether such core location reactivity level can be changed from the initial reactivity level to either satisfy a constraint or optimize cycle energy or both). Subsequent to analyzing each core location, random core loading arrangements are created and compared with the then best case loading arrangement identified.

However, even though an optimized loading arrangement that meets all applicable customer specified and governmental regulatory design constraints usually can be determined, a mislocation error (i.e., a placement of a fuel bundle in the wrong position within the core) during loading of the fuel bundles could potentially cause the requisite design constraints not to be satisfied. Specifically, two (or more) fuel bundles can be inadvertently "swapped" during the loading process causing a fuel bundle originally intended to be loaded, for example, in a position "A" to be loaded in a position "B" and vice versa. Therefore, it may be necessary to modify certain core design constraints to ensure that if such a "swap" did accidentally occur, at least the requisite governmental safety regulatory specifications will still be satisfied. Accordingly, to determine whether certain core design specification limits should be modified, it is necessary to assess the maximum adverse impact that a mislocated fuel bundle might have on the core.

Similar to determining an optimized loading arrangement, the assessment of mislocated fuel bundle impact may also be considered as a type of optimization problem, i.e., searching for the particular "optimum" loading error that results in the maximum negative impact on design margins without consideration of constraints. Unfortunately, since a conventional nuclear reactor core is composed of up to several hundred fuel bundles, the number of potential fuel bundle "swaps" resulting from a single loading error is in excess of around 100,000 possibilities. Traditionally, core loading mislocation errors are selected on a trial and error basis based on the past experience of the engineers. A particular mislocation error is simulated in a computer and the impact on design constraints and/or specified operational limitations is determined. If a particular mislocation error produces little or no impact on the operation of the reactor, then loading arrangement is modified to reflect a different mislocation error and another computer simulation is run. Man-weeks of resources can be required before most of the crucial mislocation errors are identified using the above-described procedure. Moreover, there is no assurance that the particular loading error having the greatest impact on reactor operating conditions will be identified or what the maximum impact would actually be. Consequently, it would be desirable to have a feasible and time-efficient technique, if not a direct solution, to determine a worst-case fuel bundle "swap" error for a given optimized core loading arrangement and the maximum impact of that swap on core conditions during operation.

Whenever the mislocated fuel bundle loading error problem has been addressed by conventional "prescriptive" procedures as described above, it has been shown to cause large changes in the core response. In addition, such conventional prescriptive procedures must be constantly reassessed to ensure that their applicability is still valid as new core design situations arise. Consequently, it would be desirable to also provide a methodology that is applicable to a wide range of reactors for extensive exploration of the fuel bundle mislocation error design space in a time-saving manner that provides practical solutions while avoiding the above-mentioned drawbacks of conventional "prescriptive" rules methods.

DISCLOSURE OF THE INVENTION

These and other objects may be obtained by the present invention which in one aspect is a method for identifying the worst-case impact of a mislocated fuel bundle placement in a nuclear reactor core loading arrangement. The presently preferred method generally has two phases: the first phase being an initialization phase and the second phase being a search, or "swap-case evaluation," phase.

In the initialization phase, the inherent contribution of each fuel bundle to the overall core power is determined, "swap values" are assigned to each fuel bundle, a core loading arrangement is identified (e.g., see the commonly owned co-pending application identified above describing a method for identifying an optimized loading arrangement), and base values/conditions for the loading arrangement are then determined. More specifically, in the initialization phase, each fuel bundle is assigned a relative value, called a "swap value," that lies within a predetermined range of values, called the "swap range." The swap value assigned to each bundle is based on the bundle's inherent contribution to the overall core power. Next, a set of "base condition" values for the core are determined based on the fuel bundle location arrangement. Two (2) swap variables are then defined and initialized to some arbitrary value within this swap range. Each swap variable specifies a particular fuel bundle of two hypothetically mislocated fuel bundles within the core. Finally, a simple rule is established to specify how each swap variable should be changed (i.e., "searched") over the course of multiple fuel bundle arrangement core simulations in order to maximize the impact of a particular fuel bundle swap on the predetermined base condition values for the core.

In the search or "swap-case evaluation" phase, core loading simulations are performed for a series of fuel bundle location arrangements wherein fuel bundles defined by the swap variables are interchanged or "swapped" in their respective locations in the loading arrangement. The resulting impact (or change) in core conditions for each swap (i.e., bundle mislocation error) is compared after simulation to a set of base condition values for the core to determine the impact of that particular swap case. Based on the resulting impact, the swap variables are modified and successive different swap cases for the base core arrangement are simulated and evaluated. A conventional one-dimensional search technique may be employed for modifying the swap variables between successive simulations. This "search" may be performed in a "depth" or "breadth" mode (or both) according to conventional search techniques as desired, until swap combinations for the local design space of the core are "exhausted." Subsequent to analyzing the impact of mislocation errors for a particular set of initial swap values (i.e., after the local design space has been exhausted) a new pair of swap variables are randomly selected and another series of core arrangements are evaluated. In this manner, a random "jump" to a new location in the core arrangement is accomplished so that a different region of the core loading arrangement design space may be searched (e.g., applying the same one-dimensional search techniques) using the new swap values.

In another aspect, the present invention is a system including a computer programmed to execute the above-described initialization and search phase routines. Basically, the computer system is used to execute specific program routines that simulate the operating conditions of a reactor having mislocation errors involving fuel bundle pairs in a core loading arrangement. In accordance with present invention, the routines also analyze the resultant changes in operating conditions for each simulation with respect to an initial loading arrangement and/or with respect to previously run core loading error simulations to determine the impact of the mislocation error. A "search" for the mislocation error that produces the greatest impact is conducted by simulating a large number of possible mislocation errors that could occur within the particular design space for the core and comparing the relative impact of each case. Two search variables, sometimes called "swap variables", which represent mislocated fuel bundles are used to test localized combinations of mislocated fuel bundles within the design space. The search variables are initialized to values corresponding to an arbitrary pair of bundles and search parameters are set up to implement a particular search strategy. For example, the search variables can be either incremented or decremented between successive core loading simulations. Moreover, searching can be performed in either a "depth" mode or a "breadth" mode (or both) to encompass different localized combinations and ranges of bundle pairs.

After localized combinations of bundle pairs within the design space are exhausted, random values for the search variables are generated to explore fuel bundle pairs from diverse areas in the core design space. Such randomly generated bundle pairs are sometimes referred to herein as "random jumps". Such "random jumps" within the physical design space of the core are made to potentially identify previously unconsidered combinations of fuel bundle pairs that may have a greater impact on core operations than the greatest impact identified up to that point in processing.

By programming a computer to perform such routines, the amount of engineer time required to identify the maximum impact of a mislocated fuel bundle pair can be significantly reduced as compared with conventional "prescriptive" rules methods. Such a method and system allow an extensive exploration of the fuel bundle loading arrangement design space that is applicable to a wide range of reactors for reliably identifying the maximum impact of a mislocated fuel bundle pair on operating conditions of the core. In addition, since the methodology of the present invention is independent of past experience, new core designs not previously encountered are readily analyzed without having to rely solely on empirical data. Moreover, the methodology of the present invention has the additional advantage of providing a statistical measure of the limiting swaps found.

BRIEF DESCRIPTION OF THE DRAWINGS

These and other aspects and advantages of the present invention will be described in detail with reference to the accompanying drawings, in which.

BEST MODE FOR CARRYING OUT THE INVENTION

In one aspect, the present invention is a method for identifying the maximum negative impact of a mislocated nuclear fuel bundle loading on a predetermined core loading arrangement. The method can be generally understood as having two phases: The first phase is an initialization phase and the second phase is a search, or "swap-case" evaluation, phase. Generally, in the initialization phase, base conditions for a desired core loading arrangement are identified, fuel bundle swap variables are created, and "search" rules are specified for modifying the swap variables. In the search phase, mislocated fuel bundle pairs are evaluated (i.e., a core arrangement having incorrectly positioned fuel bundles is simulated) to determine the impact a potential mislocation will have during actual reactor operation and its resultant effect on design constraint limitations. The results are then compared to the previously identified base conditions corresponding to a correctly loaded bundle arrangement or to a previous core arrangement simulation. Numerous mislocated fuel bundle pair evaluations are made covering randomly selected locations within the core loading arrangement design space through the reapplication of conventional one-dimensional search techniques in order to identify a mislocated fuel bundle pair that yields the maximum impact on the predetermined base conditions.

In another aspect, the present invention is a system including a computer programmed to execute the method described in detail below. The method can be practiced, for example, on most any type of computer including even a personal computer. The type of computer selected depends primarily on the speed at which the operator desires to have the maximum impact of a fuel bundle loading error identified and the amount of memory required for any particular operation. Such speed and memory requirements may, of course, vary depending upon the number of reactor loading arrangements being analyzed and the number of fuel bundles in the reactor's core. The method is not limited to practice on any one particular type of computer.

Figure 1:
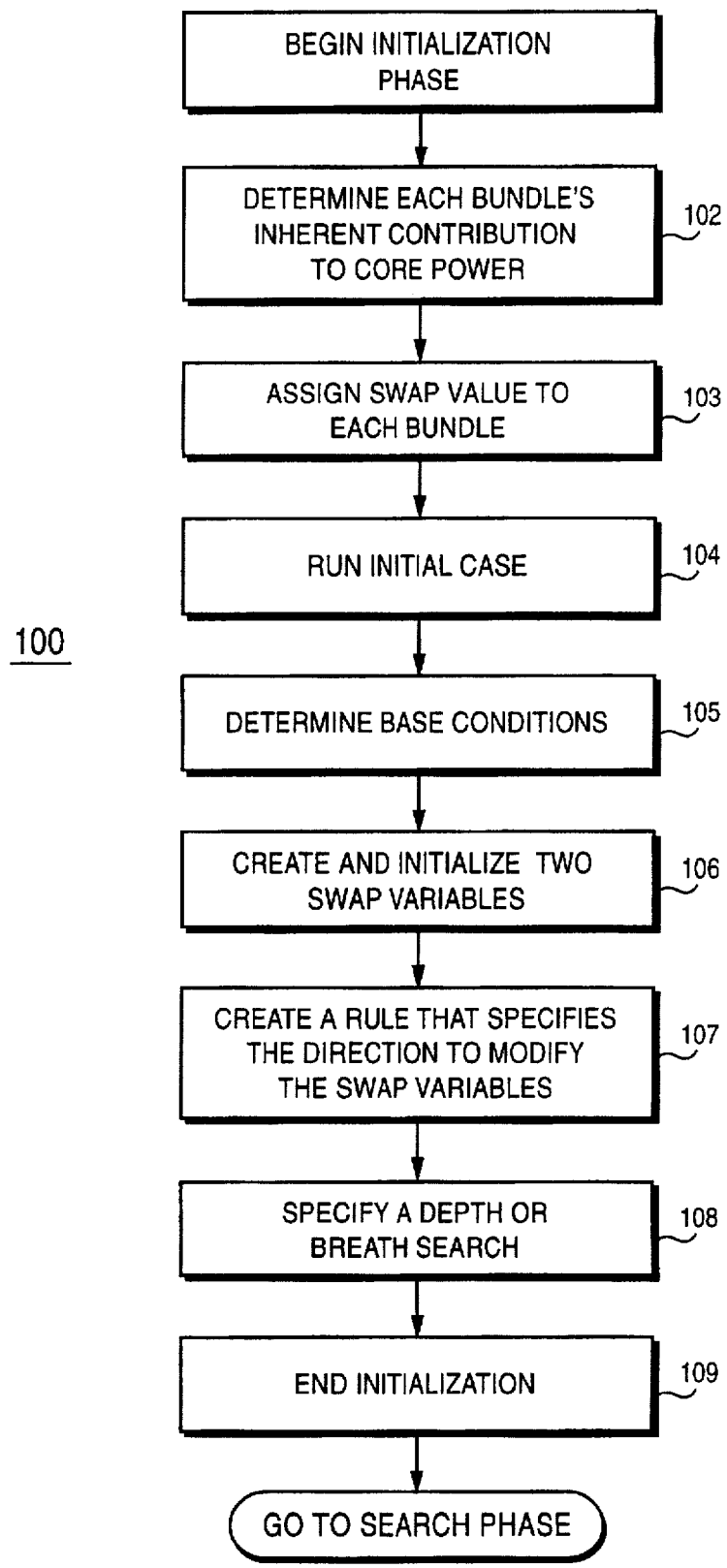
FIG. 1 is a flow chart illustrating a sequence of process steps executed in the initialization phase for identifying a maximum impact of a mislocated nuclear fuel bundle loading in accordance with one embodiment of the present invention.

Referring now specifically to FIG. 1, a sequence of a process steps 100 executed in the initialization phase for identifying the impact of a mislocated nuclear fuel bundle loading is illustrated. Initially, the inherent contribution to core power of each fuel bundle to be loaded into a reactor core is determined (102). This information may be based, for example, on the relative reactivity of each bundle. Next, a "swap" value is assigned to each bundle (103). The swap value of each bundle is a relative value that corresponds to the inherent power contribution of each bundle. For example, if 100 fuel bundles are to be loaded into the core, then each bundle is assigned a value within the range from 1 to 100 based on the corresponding contribution to overall core power of that bundle. The highest contributing bundle is assigned a swap value of 100 and the lowest contributing bundle is assigned a swap value of 1.

Subsequent to assigning each bundle a swap value as described above, an initial case fuel bundle loading arrangement is selected (104). Preferrably, an optimized fuel bundle core loading arrangement is identified (for example, using a computer simulation to evaluate various loading configurations in a manner set forth and described in the commonly owned co-pending application mention above). Once a core loading arrangement has been identified, the "base conditions" associated with that particular loading arrangement, e.g., values for thermal margins and cycle energy, are identified and saved for later use (105).

After determining the base conditions, as described above, two (2) "swap" variables are defined and initialized to some arbitrary value within the swap range defined above (106). The value of each swap variable corresponds to a particular fuel bundle and the two swap variables together specify the two fuel bundles corresponding to a hypothetically mislocated (misplaced) fuel bundle pair within an otherwise correct loading arrangement. In other words, the swap variables represent two hypothetical fuel bundles whose positions within the core have been inadvertently swapped (e.g., due to a loading error).

Nuclear core loading arrangements containing a mislocated fuel bundle loading error are evaluated during a search phase described below. Using swap variables to represent fuel bundles inadvertently swapped during loading simplifies the task of evaluating the effect on core conditions for numerous loading error possibilities. For example, an initial (e.g., random) core loading mislocation error is selected and simulated. The swap variables are then changed—representing a different mislocation loading error situation—and the resulting effect on the core conditions evaluated. A rule is established (107) for each swap variable that specifies a "direction" in which to change/modify the swap variables for each evaluation. For example, one or both swap variables may be either increased or decreased in value between successive core simulations. The rule for modifying the swap variables typically is unique for each reactor and is based primarily on the experience of the engineer. In this manner, an organized search through the multitudes of possible fuel bundle mislocations can be conducted by progressively increasing or decreasing swap variable values. Such a search can also be performed in either a "depth" or "breadth" mode in accordance with conventional n-dimensional search techniques. Therefore, as a final part of the initialization phase, either a depth or a breadth search approach is selected (108). After completion of this initialization phase (109), the search phase is begun.

Figure 2:
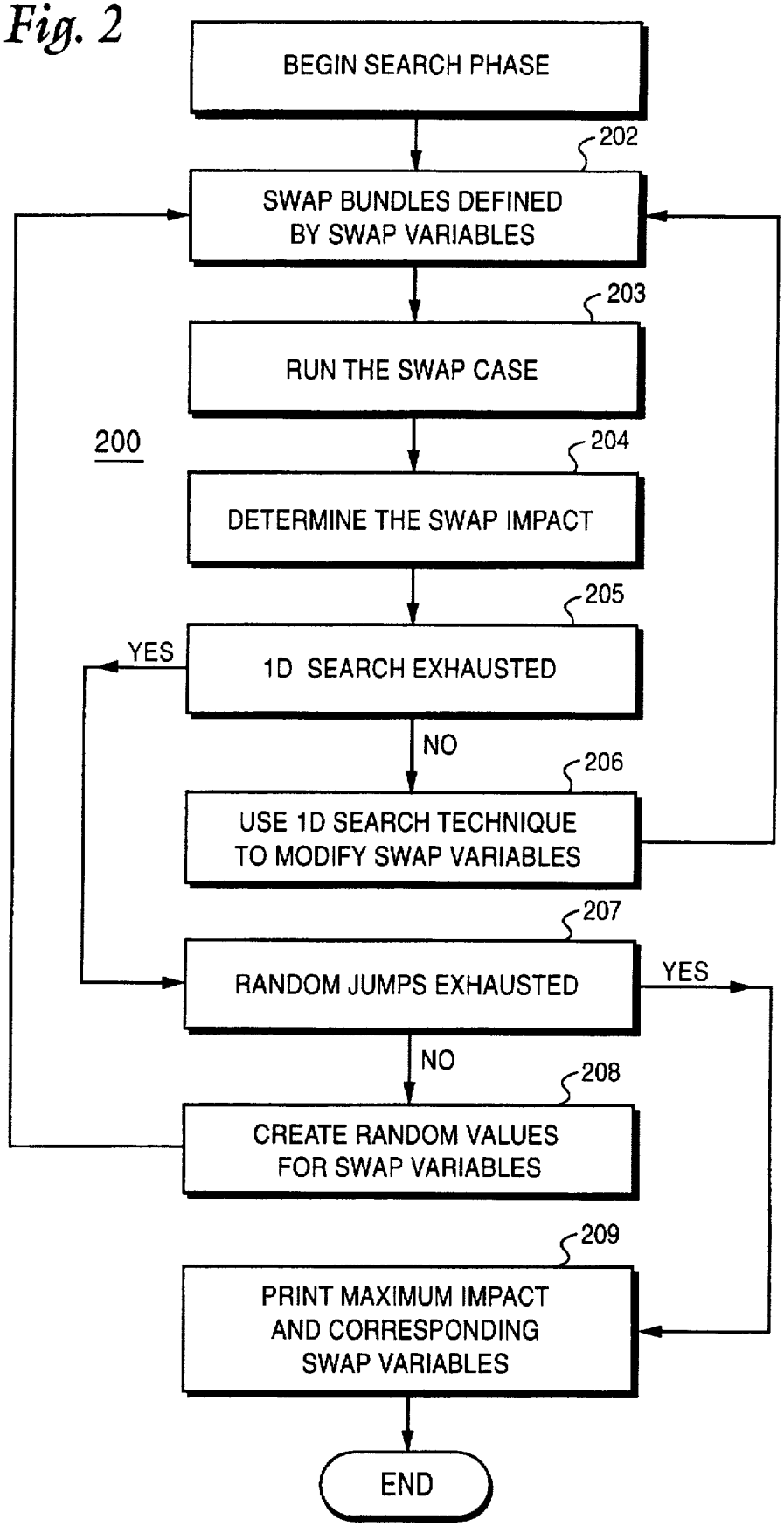
FIG. 2 is a flow chart illustrating a sequence of process steps executed in the search phase for identifying a maximum impact of a mislocated nuclear fuel bundle loading in accordance with one embodiment of the present invention.

Referring now to FIG. 2, a flow chart illustrating a sequence of process steps 200 executed in a search, or swap-case evaluation, phase for identifying the maximum impact of a mislocated fuel bundle loading is discussed. In a presently preferred embodiment, process steps 200 are executed subsequent to completion of initialization process steps 100 illustrated in FIG. 1. At the beginning of the search phase, the respective positions of fuel bundles identified by the two swap variable values are exchanged in the selected loading arrangement (202). Next, a core performance simulation is performed (203) using the loading arrangement specified by the swap variables. The effect on operating conditions of the reactor, for example, the cycle energy and core design constraints, for the swap case are determined from the simulation and the impact, i.e., changes in core conditions compared to the base conditions (or compared to a previously simulated swap-case) are determined and recorded (204).

Subsequent to each swap case simulation, the swap variables are modified in accordance with a selected search technique (206) and the impact on core operating conditions for a new swap case is determined (202, 203, 204). Once localized combinations of swap variables have been exhausted through application of, for example, a conventional one-dimensional search technique (205), random values for the two swap variables may be selected (208) and the swap variables initialized to these new values.

After a set of random values for the swap variables has been created, the selected search techniques are again applied to modify the swap variables to explore various swap impact cases which may not yet have been considered. For example, the swap variables may either be incremented or decremented in value by a specified amount between successive core simulations. Moreover, depending on whether "depth" mode or "breadth" mode searching is conducted, the impact of a particular swap case may be compared either with "base conditions" (e.g., from a selected initial core loading arrangement) or with the impact of a previously simulated swap case. Processing, therefore, returns to the beginning of the search phase (202) and continues with the simulating of core loading mislocation errors and determining of the impact for each case for localized combinations (203–206) until a predetermined number of random jumps has been exhausted (207).

The number of random jumps executed may be selected by the operator based on the amount of time available for identifying a nuclear fuel bundle pair having the greatest impact on core conditions or until all possible mislocation errors for the entire design space have been exhausted. Once the number of random jumps selected have been executed, then the swap variable pair representing a corresponding mislocated fuel bundle pair that has the greatest impact on core conditions is identified and provided along with its corresponding impact (209). In a presently preferred embodiment, location coordinates for the fuel bundles corresponding to the identified swap variable pair are provided along with a value reflecting the associated impact on reactor operation, for example, in terms of a "minimum critical power ratio."

The above-described method for identifying the maximum impact of a mislocated nuclear fuel bundle loading reduces the amount of engineer time required to identify fuel bundle mislocation errors which may cause a violation of various limits to certain design constraints. In addition, the method can be used to provide a statistical measure of the limiting swaps found. Equally important, such method is believed to be applicable to a wide range of reactors to provide an extensive exploration of the mislocated fuel bundle loading error design space involved.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the scope and spirit of the appended claims. Although the above example embodiment is directed primarily toward determining the impact of a core loading error involving the mislocation of a single fuel bundle pair, the method and system of the present invention is equally applicable to identifying the impact of mislocation errors involving greater numbers of fuel bundles. For example, it is contemplated that the number of search variables could be increased and that n-dimensional search techniques be used in accordance with the method and system of the present invention to identify the impact of a core loading error involving three or more contemporaneously mislocated fuel bundles.

What is claimed is:

1. A method for identifying a maximum potential impact on operations of a nuclear reactor of a mislocated nuclear fuel bundle in a core loading arrangement for loading nuclear fuel bundles into a reactor core, the core loading arrangement being configured to satisfy predetermined design constraints, said method comprising the steps of:

assigning a swap value to each bundle, the swap value corresponding to the inherent contribution of a bundle to overall core power output, from a predetermined arbitrary range of swap values;

simulating a first core loading arrangement for the reactor to provide a set of operating conditions, each fuel bundle having a designated location;

determining a set of base operating conditions for the reactor corresponding to the first loading arrangement;

creating a pair of swap variables having arbitrary initial values selected from said predetermined range of swap values;

swapping designated locations of a first pair of fuel bundles from the first loading arrangement to create a swap case loading arrangement;

determining an impact for the swap case by simulating the swap case loading arrangement;

modifying the swap variables by applying a predetermined numerical search technique to the range of swap values to provide different combinations of pairs of swap values;

determining the impact for successive swap case core loading simulations until the range of swap values for each swap variable has been exhausted; and recording a swap case simulation resulting in the maximum impact on reactor operations.

2. A method according to claim 1, further including a step for randomly selecting values for each of the swap variables from values within the predetermined range of swap variables to create a random swap case loading arrangement.

3. A method according to claim 1, further including a step for selecting a rule for modifying the swap variables between successive core simulations, said rule specifying whether swap variables should be incremented or decremented in value and an amount of increment or decrement.

4. A method according to claim 1, further including a step for selecting the use of either "depth" mode or "breadth" mode search techniques.

5. A computer program to determine a maximum impact on operating conditions of a nuclear reactor caused by mislocated fuel bundles in a fuel bundle loading arrangement, comprising:

means for simulating operating conditions of a reactor core having an initial fuel bundle loading arrangement to determine a set of base conditions, each fuel bundle having a designated core location, wherein a particular location of a bundle has an effect on operating conditions within the reactor;

means for simulating operating conditions of a reactor core for a swap case loading arrangement having said initial loading arrangement except for a selected pair of fuel bundles that are loaded at core locations assigned to each other in said initial loading arrangement;

means for determining an impact of the swap case loading arrangement on operating conditions of a reactor core; and means for searching through a plurality of swap case loading arrangements to determine a particular swap case having a maximum impact on core operating conditions with respect to the base conditions.

6. A system for determining a maximum impact on operating conditions of a nuclear reactor of a mislocated nuclear fuel bundle in a core loading arrangement for loading nuclear fuel bundles into a reactor core, the core loading arrangement being configured to satisfy predetermined design constraints, said system comprising a computer having a memory storage, said memory storage having stored therein rules for simulating conditions during operation of the reactor for a given core loading arrangement, said computer programmed to:

(i) simulate a first core loading arrangement to determine base operating condition values for the reactor, each fuel bundle having a designated location within the reactor core corresponding to individual characteristics of each bundle;

(ii) swap designated locations of a first pair of fuel bundles in the first loading arrangement to create a swap case loading arrangement;

(iii) simulate a core loading arrangement using the swap case loading arrangement to determine operating condition values of the reactor for the swap case loading arrangement;

(iv) determine a swap impact for the swap case loading arrangement;

(v) further create, simulate and determine a swap impact for a plurality of alternate swap case loading arrangements each comprising a different pair of swapped fuel bundle locations, wherein said different pair of swapped fuel bundle locations are obtained from a locus of fuel bundle locations corresponding to the first core loading arrangement by using conventional numerical search techniques to provide unique combinations of fuel bundle location pairs; and (vi) provide an indication of a swap case loading arrangement having the greatest impact on reactor operating conditions.

7. A system in accordance with claim 6 wherein to identify a maximum impact on the operating conditions of a nuclear reactor due to a mislocated nuclear fuel bundle, said computer is further programmed to:

randomly select a pair of locations for said first pair of fuel bundles from a predetermined core loading arrangement to create a random swap case loading error arrangement.

8. A system for determining an impact on operating conditions of a nuclear reactor resulting from a mislocated nuclear fuel bundle in a core loading arrangement for loading nuclear fuel bundles into a reactor core, the core loading arrangement being configured to satisfy predetermined design constraints, said system comprising a computer having a memory storage, said memory storage having stored therein a preferred fuel bundle core loading arrangement, base condition values for the preferred fuel bundle loading arrangement, and rules for simulating operating conditions of the reactor for a given core loading arrangement wherein each fuel bundle has a designated assigned location within the reactor core corresponding to individual reactivity characteristics; said computer programmed to:

swap designated locations of a first pair of fuel bundles in a given first loading arrangement to create a swap case loading arrangement;

simulate a core loading arrangement using the swap case loading arrangement to determine operating condition values of the reactor for the swap case loading arrangement; and determine an impact on operating conditions of the reactor for the swap case loading arrangement.

9. A system in accordance with claim 8 wherein to identify a maximum impact on the operating conditions of a nuclear reactor due to a mislocated nuclear fuel bundle, said computer is further programmed to:

further create, simulate and determine a swap impact for a plurality of alternate swap case loading arrangements each comprising a different pair of swapped fuel bundle locations, wherein said different pair of swapped fuel bundle locations are obtained from a locus of fuel bundle locations corresponding to the preferred core loading arrangement by using conventional numerical search techniques to provide unique combinations of fuel bundle location pairs; and provide an indication of a swap case loading arrangement having the greatest impact on reactor operating conditions amongst swap cases simulated.

10. A system in accordance with claim 8 wherein to identify a maximum impact on the operating conditions of a nuclear reactor due to a mislocated nuclear fuel bundle, said computer is further programmed to:

randomly select a pair of locations corresponding to a first pair of fuel bundles from the predetermined loading arrangement to create a swap case loading error arrangement.

* * * * *